United States Patent
Wang et al.

(10) Patent No.: US 11,132,039 B2
(45) Date of Patent: Sep. 28, 2021

(54) SYSTEMS AND METHODS FOR CONTROLLING CHARGING AND DISCHARGING OF AN ENERGY DEVICE BASED ON TEMPERATURE

(71) Applicant: Dell Products L.P., Round Rock, TX (US)

(72) Inventors: Lei Wang, Austin, TX (US); Zhen Huang, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 16/586,444

(22) Filed: Sep. 27, 2019

(65) Prior Publication Data

US 2021/0096619 A1 Apr. 1, 2021

(51) Int. Cl.
*G06F 1/00* (2006.01)
*G06F 11/30* (2006.01)
*G06F 1/20* (2006.01)
*G06F 1/26* (2006.01)

(52) U.S. Cl.
CPC .............. *G06F 1/206* (2013.01); *G06F 1/263* (2013.01)

(58) Field of Classification Search
CPC .................................. G06F 1/206; G06F 1/263
See application file for complete search history.

(56) References Cited

U.S. PATENT DOCUMENTS

| | | | |
|---|---|---|---|
| 2008/0018304 A1* | 1/2008 | Litingtun | H02J 7/0031 320/134 |
| 2010/0097211 A1* | 4/2010 | Silver | G08B 29/181 340/540 |
| 2012/0126751 A1* | 5/2012 | Cassidy | H01M 10/486 320/118 |
| 2013/0141051 A1* | 6/2013 | Kang | H02J 7/007192 320/134 |
| 2017/0199249 A1* | 7/2017 | Novak | G01R 31/392 |

* cited by examiner

*Primary Examiner* — Nitin C Patel
(74) *Attorney, Agent, or Firm* — Jackson Walker L.L.P.

(57) ABSTRACT

An information handling system may include an information handling resource and an energy storage device electrically coupled to the information handling resource and comprising one or more energy storage cells and a control subsystem configured to selectively enable and disable discharging of the one or more energy storage cells to the information handling resource based on a temperature associated with the energy storage device.

9 Claims, 2 Drawing Sheets

SYSTEMS AND METHODS FOR CONTROLLING CHARGING AND DISCHARGING OF AN ENERGY DEVICE BASED ON TEMPERATURE

TECHNICAL FIELD

The present disclosure relates in general to information handling systems, and more particularly to systems and methods for thermally defining enablement of a discharge of a power assist unit.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Peak power demands of information handling systems continue to increase with each new generation. Accordingly, approaches to effectively and efficiently provide such peak power demands is desired.

SUMMARY

In accordance with the teachings of the present disclosure, the disadvantages and problems associated with existing approaches to accommodating peak power demands of an information handling system may be reduced or eliminated.

In accordance with embodiments of the present disclosure, an information handling system may include an information handling resource and an energy storage device electrically coupled to the information handling resource and comprising one or more energy storage cells and a control subsystem configured to selectively enable and disable discharging of the one or more energy storage cells to the information handling resource based on a temperature associated with the energy storage device.

In accordance with these and other embodiments of the present disclosure, a method may include, in an energy storage device electrically coupled to an information handling resource, charging one or more energy storage cells and selectively enabling and disabling discharging of the one or more energy storage cells to an information handling resource based on a temperature associated with the energy storage device.

In accordance with these and other embodiments of the present disclosure, an energy storage device may include one or more energy storage cells and a control subsystem configured to selectively enable and disable discharging of the one or more energy storage cells to an information handling resource based on a temperature associated with the energy storage device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
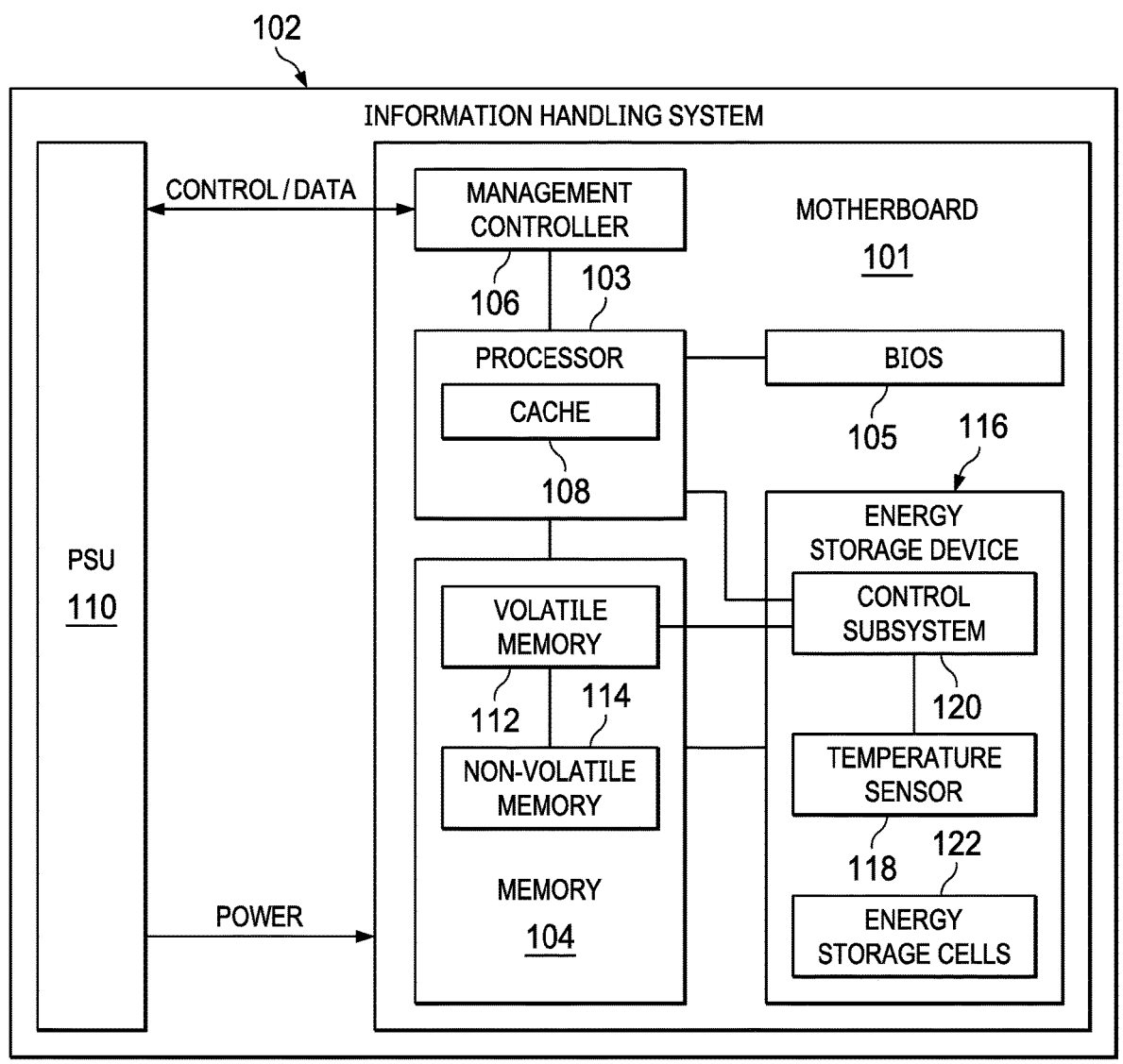
FIG. 1 illustrates a block diagram of an example information handling system, in accordance with embodiments of the present disclosure.
Figure 2:
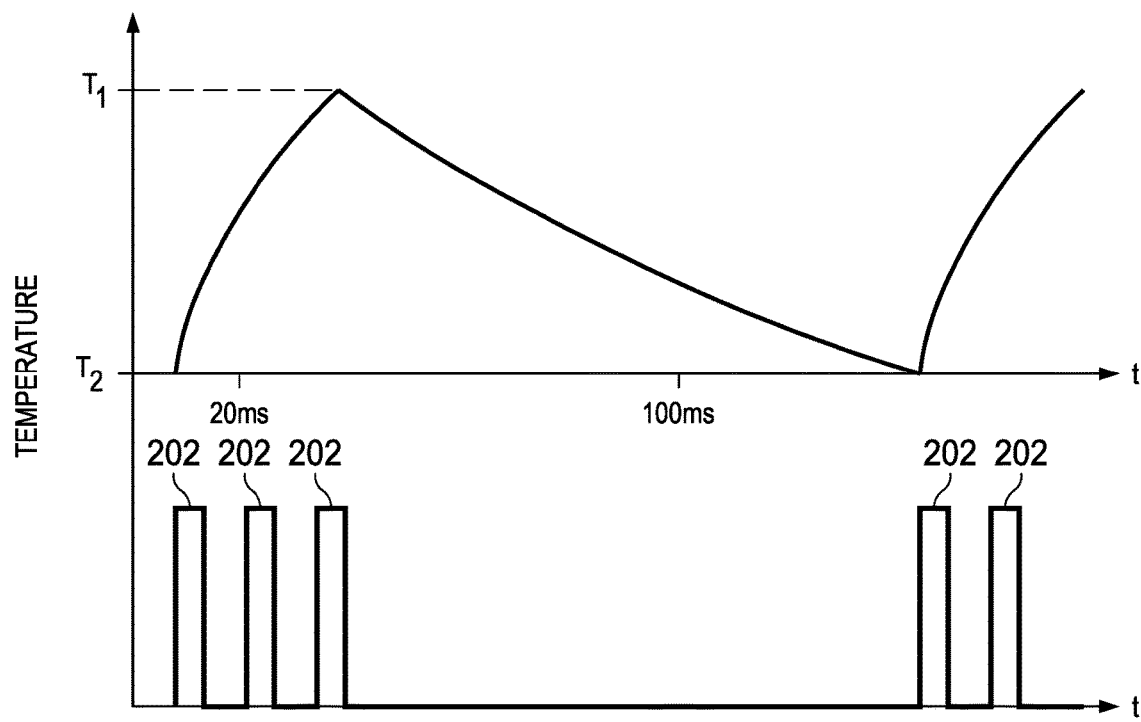
FIG. 2 illustrates example graphs of temperature associated with an energy storage device and discharge events of energy storage device versus time, in accordance with embodiments of the present disclosure.
Figure 3:
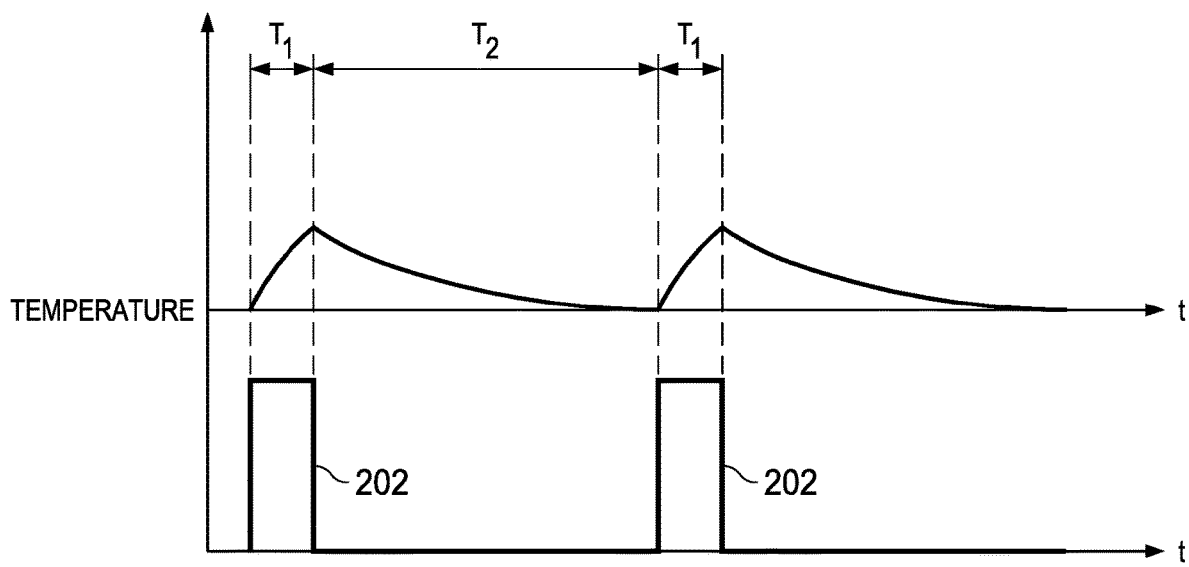
FIG. 3 illustrates additional example graphs of temperature associated with an energy storage device and discharge events of energy storage device versus time, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, a management controller 106, an energy storage device 116, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

As shown in FIG. 1, processor 103 may include a cache 108. Cache 108 may comprise a memory used by processor 103 to reduce the average time to access data from main memory 104. Cache 108 may be a smaller, faster memory than memory 104 and may store copies of frequently-used data and instructions from memory 104. In some embodiments, cache 108 may comprise an independent data cache and instruction cache. In these and other embodiments, a cache may be organized in a hierarchy of multiple cache levels (e.g., level 1, level 2, level 3, etc.). In these and other embodiments, cache levels within the hierarchy may be inclusive or exclusive. All or part of cache 108 may be configured as a write-back cache, in which processor 103 writes may be stored in cache 108 without also writing the data to memory 104, until a subsequent action such as a cache line invalidate or flush operation forces the data to be written back to memory 104. Thus in write-back cache, only the most up-to-date copy of the data may reside in cache 108 indefinitely. Some part of cache 108 may also be configured as a write-through cache, in which processor 103 writes are stored in cache 108 but also immediately to memory 104 such that memory 104 has the most up-to-date copy of the data. In some embodiments, rather than configuring cache 108 itself, the cacheability of mutually-exclusive memory address ranges may be designated as write-back, write-through, or un-cacheable by having BIOS 105 or an operating system mark the associated page tables for the address ranges of memory 104 accordingly during memory allocation. Reads from or writes to un-cacheable address ranges may not be stored in cache 108.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may comprise a persistent memory (e.g., comprising one or more NVDIMMs) that includes a volatile memory 112 (e.g., DRAM or other volatile random-access memory) and non-volatile memory 114 (e.g., flash memory or other non-volatile memory). During normal operation, when PSU 110 provides adequate power to components of information handling system 102, data written to memory 104 from processor 103 may be stored in volatile memory 112. However, in the event of loss of system input power or a power fault of PSU 110 that prevents delivery of electrical energy from PSU 110 to memory 104, data stored in volatile memory 112 may be transferred to non-volatile memory 114 in a save operation. After input power is restored, or a faulty PSU 110 is replaced, such that PSU 110 is again operable to provide electrical energy to information handling resources of information handling system 102, on the subsequent power-on of information handling system 102, data may be copied from the non-volatile memory 114 back to volatile memory 112 via a restore operation. The combined actions of data save and then data restore, allow the data to remain persistent through a power disruption. Accordingly, although not explicitly shown in FIG. 1, memory 104 may also include hardware, firmware, and/or software for carrying out save operations.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102.

Energy storage device 116 may comprise any system, device, or apparatus configured to store energy which may be used at times by one or more components of information handling system 102 to provide additional power to meet certain power requirements. For example, in some embodiments, energy storage device 116 may be used by memory 104 to perform save operations in response to a loss of system input power source (e.g., alternating current input source) or power fault of PSU 110. As another example, in these and other embodiments, energy storage device 116 may be used by processor 103 and memory 104 to provide for additional system hold-up time to allow processor 103 to flush cache 108 to non-volatile memory 114 in response to a loss of system input power source (e.g., alternating current input source) or power fault of PSU 110. As a further example, in these and other embodiments, energy storage device 116 may be used by processor 103 or other information handling resources (e.g., a graphics processing unit) to provide peak power assist for brief periods of time in which additional power beyond that available from PSU 110 may be needed to meet processing demands. As an additional example, in these and other embodiments, energy storage device 116 may be used by other information handling resources to ride-through short losses of power or other short power fault of PSU 110.

As shown in FIG. 1, energy storage device 116 may comprise a control subsystem 120, energy storage cells 122, and a temperature sensor 118.

Energy storage cells 122 may comprise one or more capacitors or "supercaps" configured to store electrical energy and deliver such electrical energy to processor 103, memory 104, and/or other components of information handling system 102 (e.g., by closure of a switch to electrically couple such one or more capacitors to such components of memory 104) when needed to provide additional power, such as save operations, cache flushes, peak power assist, and/or substitute power in the event of a power fault of PSU 110.

Temperature sensor 118 may be communicatively coupled to control subsystem 120 and may include any system, device, or apparatus (e.g., a thermometer, thermistor, etc.) configured to communicate a signal to control subsystem 120 indicative of a temperature associated with energy storage device 116.

Control subsystem 120 may be communicatively coupled to processor 103, memory 104, and/or one or more other components of information handling system 102 and may comprise any suitable system, device, or apparatus configured to control operation of energy storage device 116. For example, as described in greater detail below, control subsystem 120 may be configured to receive a signal indicative of a temperature associated with energy storage device 116 and based on such temperature, selectively enable or disable energy discharging events of energy storage device 116. Accordingly, to prevent over-temperature conditions of energy storage device 116 caused by discharging events, control subsystem 120 may disable discharging events when a temperature associated with energy storage device 116 is above a threshold temperature.

In some embodiments, energy storage device 116 may be integral to a discharger which may include one or more semiconductor devices in addition to energy storage device 116. In such embodiments, temperature sensor 118 may measure temperature of or proximate to such one or more semiconductor devices.

As example of temperature-based discharging of energy storage device, in some embodiments, as depicted in FIG. 2, which depicts example graphs of temperature associated with energy storage device 116 and discharge events of energy storage device 116 versus time, control subsystem 120 may enable discharging events 202 (e.g., by communicating an appropriate signal to other components of information handling system 102) until a first threshold temperature $T_1$ proximate to energy storage cells 122 is reached, and then disable discharging events 202 (e.g., by communicating an appropriate signal to other components of information handling system 102) once first threshold temperature $T_1$ is reached. After discharging events 202 are disabled, control subsystem 120 may again enable discharging events 202 once the temperature associated with energy storage device 116 has dropped below a second threshold temperature $T_2$. In some embodiments, control subsystem 120 may be able to perform self-calibration operations to determine a time it takes for the temperature to rise from the second threshold temperature $T_2$ to the first threshold temperature $T_1$ during successive discharge events and a time it takes for the temperature to fall from the first threshold temperature $T_1$ to the second threshold temperature $T_2$ in the absence of discharging events.

In alternative embodiments, as depicted in FIG. 3, which depicts additional example graphs of temperature associated with energy storage device 116 and discharge events of energy storage device 116 versus time, control subsystem 120 may maintain a safe temperature associated with energy storage device 116 by limiting an amount of time that discharging events may be enabled. For example, control subsystem 120 may enable discharging events for a period of time $t_1$, after which it may disable discharging events for a period of time $t_2$, after which it may again enable discharging events for another period of time $t_1$.

In addition to motherboard 101, processor 103, memory 104, BIOS 105, management controller 106, energy storage device 116, and PSU 110, information handling system 102 may include one or more other information handling resources. For example, in some embodiments, information handling system 102 may include more than one PSU 110 and/or more than one energy storage device 116.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   an information handling resource; and
   an energy storage device electrically coupled to the information handling resource and comprising:
   one or more energy storage cells; and
   a control subsystem configured to:
   monitor a temperature associated with the energy storage device;
   selectively enable discharging of the one or more energy storage cells to the information handling resource when the temperature as monitored is below a first threshold temperature; and
   selectively disable discharging of the one or more energy storage cells to the information handling resource when the temperature as monitored reaches the first threshold temperature and until the temperature as monitored falls below a second threshold temperature.

2. The information handling system of claim 1, wherein the control subsystem is configured to:
   determine a first period of time required for the temperature as monitored to increase from the second threshold temperature to the first threshold temperature while discharging occurs; and
   determine a second period of time required for the temperature as monitored to decrease from the first threshold temperature to the second threshold temperature.

3. The information handling system of claim 1, wherein the control subsystem is configured to, in a periodic manner:
   enable discharging of the one or more energy storage cells to the information handling resource for a first period of time; and
   disable discharging of the one or more energy storage cells to the information handling resource for a second period of time.

4. A method comprising, in an energy storage device electrically coupled to an information handling resource:
   charging one or more energy storage cells;
   monitoring a temperature associated with the energy storage device;
   selectively enabling discharging of the one or more energy storage cells to the information handling resource when the temperature as monitored is below a first threshold temperature; and
   selectively disabling discharging of the one or more energy storage cells to the information handling resource when the temperature as monitored reaches the first threshold temperature and until the temperature as monitored falls below a second threshold temperature.

5. The method of claim 4, further comprising:
   determining a first period of time required for the temperature as monitored to increase from the second threshold temperature to the first threshold temperature while discharging occurs; and
   determining a second period of time required for the temperature as monitored to decrease from the first threshold temperature to the second threshold temperature.

6. The method of claim 4, further comprising, in a periodic manner:
   enabling discharging of the one or more energy storage cells to the information handling resource for a first period of time; and
   disabling discharging of the one or more energy storage cells to the information handling resource for a second period of time.

7. An energy storage device comprising:
   one or more energy storage cells; and a control subsystem configured to:
  monitor a temperature associated with the energy storage device;
  selectively enable discharging of the one or more energy storage cells to the information handling resource when the temperature as monitored is below a first threshold temperature; and
  selectively disable discharging of the one or more energy storage cells to the information handling resource when the temperature as monitored reaches the first threshold temperature and until the temperature as monitored falls below a second threshold temperature.

8. The energy storage device of claim 7, wherein the control subsystem is configured to:
  determine a first period of time required for the temperature as monitored to increase from the second threshold temperature to the first threshold temperature while discharging occurs; and
  determine a second period of time required for the temperature as monitored to decrease from the first threshold temperature to the second threshold temperature.

9. The energy storage device of claim 7, wherein the control subsystem is configured to, in a periodic manner:
  enable discharging of the one or more energy storage cells to the information handling resource for a first period of time; and
  disable discharging of the one or more energy storage cells to the information handling resource for a second period of time.

* * * * *